(12) United States Patent
Heim et al.

(10) Patent No.: US 10,213,970 B2
(45) Date of Patent: Feb. 26, 2019

(54) INFUSION METHOD AND A SYSTEM FOR AN INFUSION METHOD

(75) Inventors: Clemens Heim, Stade (DE); Hauke Seegel, Nahrendorf (DE); Paulin Fideu, Stade (DE); Axel Herrmann, Stade (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 530 days.

(21) Appl. No.: 13/519,947

(22) PCT Filed: Dec. 29, 2010

(86) PCT No.: PCT/EP2010/070830
§ 371 (c)(1),
(2), (4) Date: Oct. 9, 2012

(87) PCT Pub. No.: WO2011/080289
PCT Pub. Date: Jul. 7, 2011

(65) Prior Publication Data
US 2013/0069286 A1    Mar. 21, 2013

(30) Foreign Application Priority Data

Dec. 29, 2009  (DE) .......... 10 2009 060 705
Dec. 12, 2010  (DE) .......... 10 2010 062 871

(51) Int. Cl.
*B29C 70/48*  (2006.01)
*B29C 70/36*  (2006.01)
(Continued)

(52) U.S. Cl.
CPC ............ *B29C 70/36* (2013.01); *B29C 70/443* (2013.01); *B29C 70/48* (2013.01); *B29D 99/0014* (2013.01); *B29L 2031/3082* (2013.01)

(58) Field of Classification Search
CPC ....... B29C 70/36; B29C 70/443; B29C 33/10; B29D 99/0014; B29L 2031/3082
See application file for complete search history.

(56) References Cited

U.S. PATENT DOCUMENTS 2,913,036 A * 11/1959 Smith ........................ 264/102
4,132,755 A *  1/1979 Johnson ...................... 264/553
(Continued)

FOREIGN PATENT DOCUMENTS

DE     10 2007 061431 A1   6/2009
EP          1 484 164 A2  12/2004
(Continued)

OTHER PUBLICATIONS

Partial Translation of EP 1484164 to Bauer, Dec. 8, 2004.*
(Continued)

*Primary Examiner* — Matthew J Daniels
(74) *Attorney, Agent, or Firm* — Carter, DeLuca, Farrell & Schmidt LLP

(57) ABSTRACT

Disclosed is an infusion method for the manufacture of a fiber-reinforced composite component with semi-finished textile products in an open molding tool, in which at least one local gas reception space is designed for the reception of volatile substances, such as resin gases and residual air contained in the matrix material and/or in the system, which gas reception space is blocked off from the matrix material by a local semi-permeable membrane; also disclosed is a system for the execution of such a method.

10 Claims, 3 Drawing Sheets

(51) Int. Cl.
*B29C 70/44* (2006.01)
*B29D 99/00* (2010.01)
*B29L 31/30* (2006.01)

(56) References Cited

U.S. PATENT DOCUMENTS

| | | | | |
|---|---|---|---|---|
| 4,816,106 | A | * | 3/1989 | Turris et al. .................. 156/285 |
| 4,902,215 | A | * | 2/1990 | Seemann, III ............... 425/406 |
| 4,917,353 | A | * | 4/1990 | Riley ........................... 251/148 |
| 4,942,013 | A | * | 7/1990 | Palmer et al. ................ 264/511 |
| 5,015,168 | A | * | 5/1991 | Boime et al. ................ 425/389 |
| 5,024,399 | A | * | 6/1991 | Barquet et al. .............. 244/119 |
| 5,061,542 | A | * | 10/1991 | Brace ........................... 428/121 |
| 5,403,537 | A | * | 4/1995 | Seal et al. .................... 264/511 |
| 5,454,895 | A | * | 10/1995 | Imparato ...................... 156/156 |
| 5,593,633 | A | * | 1/1997 | Dull et al. .................... 264/510 |
| 5,709,893 | A | * | 1/1998 | McCarville ............ B29C 33/10 |
| | | | | 264/257 |
| 6,257,858 | B1 | * | 7/2001 | Pabsch ................. B29C 70/443 |
| | | | | 264/571 |
| 6,391,246 | B2 | * | 5/2002 | Shiraishi et al. ............. 264/510 |
| 6,478,922 | B1 | * | 11/2002 | Rosevear ............... B29C 70/44 |
| | | | | 156/297 |
| 6,523,246 | B1 | * | 2/2003 | Matsui .................... B29C 70/44 |
| | | | | 29/281.1 |
| 7,160,498 | B2 | * | 1/2007 | Mataya ......................... 264/510 |
| 2001/0035249 | A1 | * | 11/2001 | Kondo ................. B29C 70/345 |
| | | | | 156/65 |
| 2002/0020934 | A1 | * | 2/2002 | Hinz ............................. 264/40.6 |
| 2002/0027187 | A1 | * | 3/2002 | Sato ....................... B29C 70/44 |
| | | | | 249/187.1 |
| 2003/0019567 | A1 | | 1/2003 | Burpo et al. |
| 2004/0183227 | A1 | * | 9/2004 | Velicki .................... B29C 65/00 |
| | | | | 264/236 |
| 2004/0265406 | A1 | * | 12/2004 | Lorenz .................. B29C 70/342 |
| | | | | 425/110 |
| 2005/0034603 | A1 | * | 2/2005 | Lippert et al. .................. 96/193 |
| 2008/0093761 | A1 | * | 4/2008 | Hansen ................. B29C 70/546 |
| | | | | 264/46.6 |
| 2008/0099597 | A1 | * | 5/2008 | Pham et al. ................. 242/615.4 |
| 2008/0136060 | A1 | * | 6/2008 | Shpik et al. .................. 264/319 |
| 2008/0220112 | A1 | * | 9/2008 | Waldrop et al. ........... 425/405.1 |
| 2008/0305340 | A1 | | 12/2008 | Fang et al. |
| 2013/0069281 | A1 | * | 3/2013 | Hurlin .................. B29C 33/308 |
| | | | | 264/328.1 |
| 2014/0166191 | A1 | * | 6/2014 | Cottrell ................. B29C 70/443 |
| | | | | 156/182 |

FOREIGN PATENT DOCUMENTS

| | | | |
|---|---|---|---|
| EP | 1484164 | * | 12/2004 |
| EP | 1 859 920 A1 | | 11/2007 |
| EP | 2181834 A2 | | 5/2010 |
| WO | WO2008114809 | * | 9/2008 |

OTHER PUBLICATIONS

International Preliminary Report on Patentability dated Jul. 19, 2012 in corresponding application No. PCT/EP2010/070830.
International Search Report for Appln. No. PCT/EP2010/070830 dated May 20, 2011.
Office Action for corresponding European Patent Application No. 10799055.8 dated Jun. 15, 2016.

* cited by examiner

INFUSION METHOD AND A SYSTEM FOR AN INFUSION METHOD

TECHNICAL FIELD

The invention concerns an infusion method in a moulding tool that is open on one side in accordance with the preamble of claim 1, and a system for an infusion method for the manufacture of a fibre-reinforced composite component in a moulding tool that is open on one side in accordance with the preamble of claim 9.

BACKGROUND OF RELATED ART

A system for an infusion method of known art, for the manufacture of a fibre-reinforced composite component in a moulding tool that is open on one side, is shown in FIG. 1. In this two-chamber system 1, which is based on the vacuum-assisted-process (VAP) that is described in detail in the patent DE 10013409C1, a component 6 of at least one dry fibre-reinforced semi-finished product, for example a fibre mat composed of a multiplicity of carbon fibres, is laid down on a surface 2 of a moulding tool 4 that is open on one side. The moulding tool 4 is arranged in a vacuum chamber 8, which is formed from a vacuum film 10 encasing the component 6 and which is supported via sealing elements 12 on the surface 2 of the moulding tool 4. The evacuation of the vacuum chamber 8 takes place via a suction device 14 located near the moulding tool. For purposes of infiltrating the component 6 with a matrix material, for example an epoxy resin, a sprue 16 located remotely from the moulding tool is provided for purposes of supplying the resin. The distribution of the resin over the component 6 takes place via a global flow aid 18 spanning across the semi-finished product 6, which is separated from a surface 24 of the component via a perforated film 20 and a peel ply 22. The flow aid 18, the perforated film 20, the peel ply 22, and also the component 6, are covered by a membrane 26, which with the vacuum film 10 bounds an air chamber 28 and via sealing elements 12 makes contact with the moulding tool surface 2. The membrane 26 has semi-permeable properties and usually has a structure composed of a technical plastic material. It is porous to gases or volatile substances, but holds back fluids with viscosities that are comparable with that of water. These semi-permeable properties are achieved by means of the porous pores or meshes that are located in the membrane 26, which are more or less evenly distributed over the membrane surface. The thickness of the membrane is usually of the order of tenths of a millimeter. In principle the membrane 26 seals off the system that is to be impregnated, including the flow aid 18, from the vacuum film 10, wherein by means of the global air chamber 28 a two-dimensional vacuum distribution is achieved on the surface 24 of the semi-finished product 6. For purposes of improved or targeted guidance of the air or gases in the air chamber 28 in the direction of the suction unit 14 a ventilation ply 30 is arranged between the membrane 26 and the vacuum film 10.

However, this system of known art is only suitable to a limited extent for the manufacture of complex components, since in particular the membrane is a highly complex and sensitive ancillary substance, which, if it is incorrectly draped, loses its semi-permeable properties and can also very quickly tear, so that imperfections are generated in the component to be manufactured, and the components thus have a lower quality. Moreover the membrane is very expensive, so that the replacement of a torn or damaged membrane is inevitably reflected in high material costs.

SUMMARY

The object of the present invention is to create an infusion method and also a system for an infusion method in a moulding tool that is open on one side, which removes the above-cited disadvantages and ensures the reliable manufacture of complex components with a repeatably high quality.

This object is achieved by means of an infusion method with the features of claim 1, and by means of a system for an infusion method with the features of claim 9.

In an inventive infusion method for the manufacture of a fibre-reinforced composite component with semi-finished textile products, which form the composite component to be impregnated with a matrix material, the semi-finished products are arranged in a moulding tool that is open on one side in a chamber to be evacuated. In accordance with the invention at least one local gas reception space is formed between the composite component and a chamber wall, which is blocked off from the matrix material by at least one local membrane that is porous to gases, and into which volatile substances contained in the matrix material and/or in the system leak during the infiltration process.

The method, designated in accordance with the invention as a local-assisted-vacuum-process (L-VAP), is suitable for the cost effective manufacture of complex components with a repeatably high quality, since by the formation of the local gas reception space the effort associated with the draping of the local membrane or membranes is simplified and furthermore the extensive volatile components contained in the system and in the resin, can leak through. The design of a global air chamber spanning across the component to be produced is omitted, instead just targeted local gas reception spaces, i.e. gas reception sub-spaces, are formed, which enable the reliable extraction of volatile components such as gases and residual air contained in the system and in the resin; thanks to the local membranes, however, the matrix material is held back. The inventive method moreover allows for simple draping of the at least one membrane, so that its properties of being porous to gases while blocking the matrix material are not lost or are not reduced. By this means the risk of imperfections within the component is significantly reduced and thus the component quality is significantly and repeatably increased. Moreover the method enables the removal by suction taking place during the resin infusion to be omitted, so that the complexity of the device is reduced. Furthermore in the inventive solution it is no longer necessary to know the exact position of the matrix material in the flow fronts running together from a plurality of sides.

In order to prevent the structure of the membrane from being disadvantageously modified and possibly losing its semi-permeable properties, the membrane is preferably introduced on surfaces that are flat, or only slightly curved, or on surfaces that, while they are in fact strongly curved, are only curved in one dimension.

In one example of embodiment the at least one gas reception space is evacuated at the same time as the evacuation of the chamber. This ensures that the gas reception space is free of gases and has a maximum reception volume.

The at least one gas reception space can be arranged in the region of the flow fronts that are running together, so that the gases that are driven ahead of the matrix material are reliably driven into the gas reception space.

In one example of embodiment at least one dimensionally stable gas reservoir is arranged in the at least one gas reception space. This prevents the volume of the gas reception space from being reduced during the evacuation of the chamber. Moreover the gas reservoir has a stable maximum storage volume. At the same time the at least one membrane can be arranged directly on the gas reservoir, so that the gas reservoir forms the gas reception space directly.

The at least one gas reservoir can be dimensionally stable such that it can be introduced to support a region of the component. In this variant the gas reservoir acts as a pressure piece or mould core, as a result of which with the use of a multiplicity of such gas reservoirs the number of parts is reduced by virtue of the multi-functionality of the gas reservoir, and despite the local arrangement of the gas reservoirs a nearly two-dimensional extraction of gases takes place. Moreover by the use of the gas reservoirs as moulding elements pressure points on the composite component are avoided.

In a cost effective variant the at least one gas reservoir is combined with a closed, i.e. sealed, moulding element to support a region of the component.

The gases leaking into the at least one gas reception space, i.e. the at least one gas reservoir, can be purged from the gas reception space, i.e. the gas reservoir, via a suction device. By this means the behaviour of the flow fronts can be controlled in a targeted manner. Moreover the at least one gas reservoir can, for example, be designed with a smaller storage volume.

An inventive system (assembly) for an infusion method for the manufacture of a fibre-reinforced composite component with semi-finished textile products, which are laid down in a moulding tool open on one side in a chamber to be evacuated, and which form a composite component to be infiltrated by a matrix material, in accordance with the invention has for the reception of volatile substances contained in the matrix material and/or in the system at least one local gas reception space between the composite component and a chamber wall, which is blocked off from the matrix material by means of at least one local membrane that is porous to gas.

Such a system is particularly suitable for the cost-effective manufacture of complex components with a quality that is highly reproducible, since the at least one local gas reception space, or the gas reception sub-spaces, can be designed on regions of the component that have a simple geometry such as, for example, a flat, or only slightly curved surface, or which are in fact strongly curved, but only in one dimension. One example for a surface that is strongly curved in one dimension is a stepped or rectangular surface profile, such as is possible in the region connecting stiffening element feet to skin fields. By this means damage to the local membrane is ruled out and optimal functionality of the membrane is thus ensured. Moreover by means of an appropriate number of gas reception spaces removal by suction over an extensive surface area is ensured.

In one example of embodiment a gas reservoir is positioned in the at least one gas reception space, which allows for the storage of the volatile gases. This example of embodiment is identified by a particularly simple form of system, since by virtue of their robustness the gas reservoir or reservoirs can be positioned on the semi-finished product in a virtually flexible manner, and the provision of an individual suction device is omitted. The gas reservoirs can easily be positioned on curved or edged, i.e. stepped, component surfaces, without the fear of a significant impairment of their storage volume. The shapes of the gas reservoirs can be individually customised, for example by cutting, milling, or drilling, and can thus be optimally adapted to the respective component region.

The at least one gas reservoir preferably has an open-pore, or porous, material structure, similar to that of a sponge or a foam. Examples of embodiment include an open-pore metal foam or an open-pore plastic foam.

In one example of embodiment the membrane is detachably arranged on a contact surface of the at least one gas reservoir facing towards a component region. By this means the positioning of the membrane on the component region is omitted, which significantly simplifies its installation, i.e. the draping procedure. Here as a result of the detachable arrangement of the membrane the latter can simply be removed when worn out and replaced by a new membrane, without having to dispose of the gas reservoir itself.

The at least one gas reservoir is preferably dimensionally stable, so that when the chamber is evacuated the gas reservoir is not subjected to any alteration in shape, thus ensuring that it always has its maximum storage volume.

In one example of embodiment the at least one gas reservoir forms at least one section of a moulding element. By this means the multiplicity of parts of the system is reduced and in particular, despite the targeted local formation of gas reception spaces, gas reception can take place over an extensive surface area. An exemplary gas reservoir that is particularly suitable as a moulding element, e.g. a pressure piece, has a fixed frame structure with, in part, open and/or porous regions. The cavity can, for example, be opened up to the external environment in some regions by means of holes, or hole-type openings, in the wall. Likewise the gas reservoir can have a latticed wall, via whose lattice meshes an evacuation of the cavity and a reception of gases can take place. To avoid any entry of resin through the openings, e.g. the lattice meshes, into the cavity the gas reservoir in question can in each case be covered with a membrane.

In one example of embodiment the at least one gas reception space, i.e. the at least one gas reservoir, is connected in fluid terms with a suction device so that, for example, the volatile substances leaking out of the matrix material into the gas reception spaces can be subjected, for example, to a cleaning process.

Other advantageous examples of embodiment are the subjects of further subsidiary claims.

BRIEF DESCRIPTION OF THE DRAWINGS

In what follows preferred examples of embodiment are elucidated in more detail with the aid of highly simplified schematic representations. Here.

DETAILED DESCRIPTION

Figure 1:
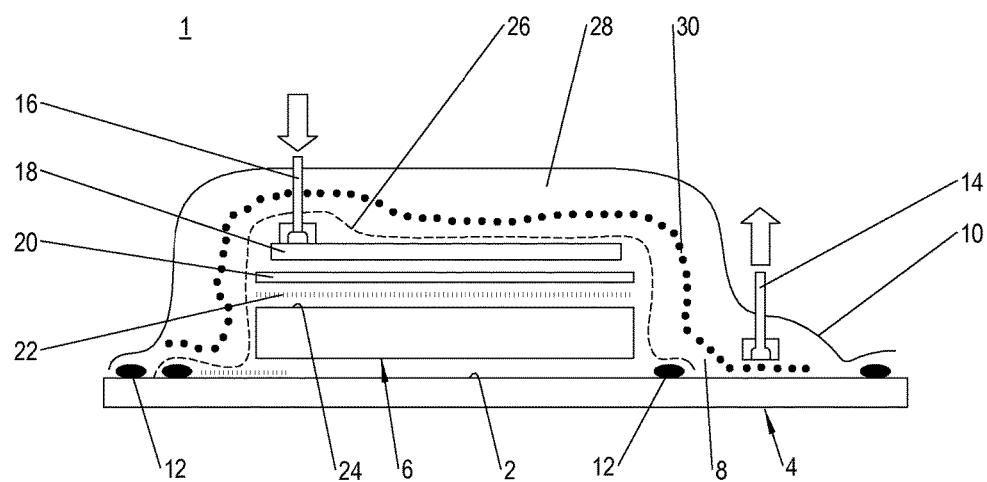
FIG. 1 shows a system of an infusion method of known art.
Figure 2:
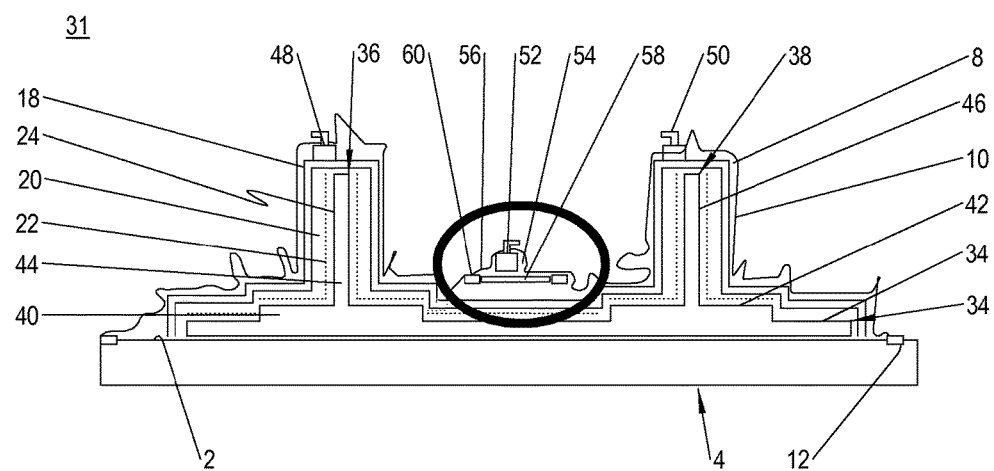
FIG. 2 shows a first system in accordance with the inventive local-assisted-vacuum-process (L-VAP)

FIG. 2 shows a cross-section through a first inventive system (assembly) 31 for the manufacture of a monolithic fibre-reinforced composite component 32. The component to be produced 32 consists of a multiplicity of dry fibre mats, knitted fabrics, woven fabrics or similar and during the manufacture process is impregnated over its cross-section with a matrix material, for example an epoxy resin or a polyester resin. In the example of embodiment shown the component 32 is a skin field of an aircraft fuselage, which is formed from a fabric 34 forming the outer skin of the aircraft, and from stringers 36, 38 stabilising the fabric 34. The stringers 36, 38 have in each case a foot section 40, 42, by means of which they are baked onto the fabric, and in each case a web 44, 46 arranged centrally on the foot section 40, 42. The curvature of the fabric 34, i.e. of the skin field, is not represented the interests of clarity. Likewise in the interests of clarity none of the moulding elements, such as mould cores or pressure pieces, that stabilise the stringers 36 laterally during manufacture, are shown in FIG. 2.

The component 32 is laid down over the fabric 34 onto a surface 2 of a moulding tool 4 that is open on one side, and is positioned in a vacuum chamber 8 formed from a vacuum film 10. The vacuum film 10 encloses the semi-finished product 6, and is sealed with respect to the external environment by means of sealing elements 12 making contact with the moulding tool 4.

The supply of the resin into the vacuum chamber 8 and thus to the component 32 to be produced takes place via sprues 48, 50, which are arranged remotely from the moulding tool in the region of head sections of the webs 44, 46. For purposes of distributing the resin over the component 32 a global flow aid 18 is arranged on the component 32 and is separated from the component surface 2 via a perforated film 20 and also a multiplicity of individual peel plies 22.

The removal by suction of gases and volatile substances located in the system and in the resin, takes place via at least one suction device 52 located close to the moulding tool, which as seen in the vertical direction is arranged underneath the sprues 48, 50 between the foot sections 40, 42 of the stringers 36, 38, and in the drawing is emphasised in terms of an oval edging. Here the suction device 52 is preferably positioned in the region in which the resin fronts, i.e. flow fronts, run together, since these drive ahead of them the residual air in the vacuum chamber 8 and other gases that are released from the resin. The suction device 52 is connected in fluid terms with a local gas reception space 54, which is formed between a chamber wall, i.e. a film section 56, and a membrane 58 on the component side, and laterally is bounded by at least one or a plurality of peripheral sealing elements 60, by means of which the film section 56 is supported on the flow aid 18. The membrane 58 has semi-permeable properties and allows the exit of the residual air and/or gases from the vacuum chamber 8 and the resin into a gas reception space 54, but prevents the entry of the resin. Thus the membrane 58 blocks off the gas reception space 54 with respect to the resin, as a result of which any outflow of the fluid resin into the suction device 52 is prevented.

In one inventive infusion method the component 32 to be produced is packaged in accordance with the system 31. The vacuum chamber 8 is then evacuated by means of the suction device 52, or a plurality of suction devices 52, and by means of the sprues 48, 50 the resin is supplied and by means of the flow aid 18 is evenly distributed over the component surface 24. The resin penetrates the stringers 36, 38 and also the fabric 34 in the vertical, i.e. the thickness direction, wherein two flow fronts (not shown) are formed that move towards each other. The flow fronts drive the residual air located in the system 31 and also the gases and/or volatile substances contained in the resin in front of them until the latter enter through the respective semi-permeable sub-membrane 58 into the local gas reception spaces 54 and are there removed by suction. With the coming together of the flow fronts the component 32 is fully impregnated with the resin, and is degassed by means of the gas reception spaces 54. Here the membranes 58 prevent the fluid resin from being pushed out, i.e. from flowing out, of the component 32 once again via the gas reception spaces 54. After the component 32 has been impregnated it is cured and further processing steps, such as a quality check, are subsequently executed.

Figure 3:
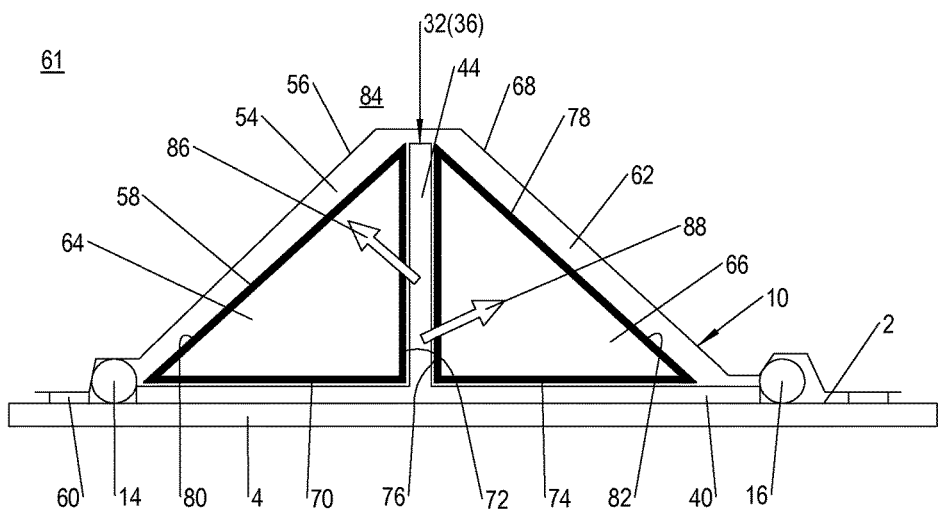
FIG. 3 shows a second system in accordance with the inventive infusion method.

FIG. 3 shows a cross-section through a second inventive system 61 for the manufacture of a composite component 32 from a multiplicity of semi-finished textile products positioned in an open moulding tool 4. In the interests of clarity the composite component 32 is shown as a T-shaped stiffening element 36. In a significant difference from the system 31 in FIG. 2 in this system 61, gas reservoirs 64, 66 are positioned in each of the gas reception spaces 54, 62; in addition to storage of the volatile substances received from the matrix material or from the system, these also act as moulding elements for the stiffening element 36. Moreover in the variant shown in FIG. 3 no suction device 52 is provided (with regard to the removal by suction see FIG. 5).

The gas reception spaces 54, 62 extend laterally relative to the stiffening element 36 over the whole of its axial length and are essentially bounded by its foot section 40, its web 44 and also in each case by a film section 56, 68 of a vacuum film 10. Thus the gas reception spaces 54, 62 have a triangular cross-section. For purposes of closing off the gas reception spaces 54, 62 in a pressure-tight manner a sealing element 60 is arranged at the side of the foot section 40 on a moulding tool surface 2; the vacuum film 10 makes contact with the sealing element. For purposes of evacuating the system 61 at least one suction device 14 is arranged at the side of the foot section 40. For purposes of infusing the resin least one sprue 16 is arranged at the side of the foot section 40.

The gas reservoirs 64, 66 have a triangular cross-section corresponding to that of the gas reception spaces 54, 56 and have an open-pore material structure for purposes of storing the residual air expelled from the composite component 32 into the gas reception spaces 54, 62. In order to prevent their pores from being afflicted with the matrix material, the gas reservoirs 64, 66 are provided on their contact surfaces 70, 72, 74, 76 facing towards the stiffening element 36 and located in contact with the latter, with a semi-permeable membrane 58, 78. In this manner the membranes 58, 78 forming the gas reception spaces 56, 62 are connected to the gas reservoirs 64, 66, as a result of which the latter directly form the gas reception spaces 56, 62. Moreover the membranes 58, 78 extend over an outer surface 80, 82 facing towards the respective film sections 56, 68 of the vacuum film 10, so that the gas reservoirs 64, 66 are provided in each case with one of the membranes 58, 78 at least in the region of their side surfaces 70, 72, 80 and 74, 76, 82 respectively. At the same time the membranes 58, 78 are detachably secured to the gas reservoirs 64, 66, so that when they are worn out they can be replaced with functional membranes 58, 78. Needless to say, however, the gas reception spaces 56, 62 can also be blocked off from the matrix material with a membrane 58, 78, and the gas reservoirs 64, 66 with their free side surfaces 70, 72, 74, 76, 80, 82 can then be positioned in the gas reception spaces 56, 62.

Figure 4:
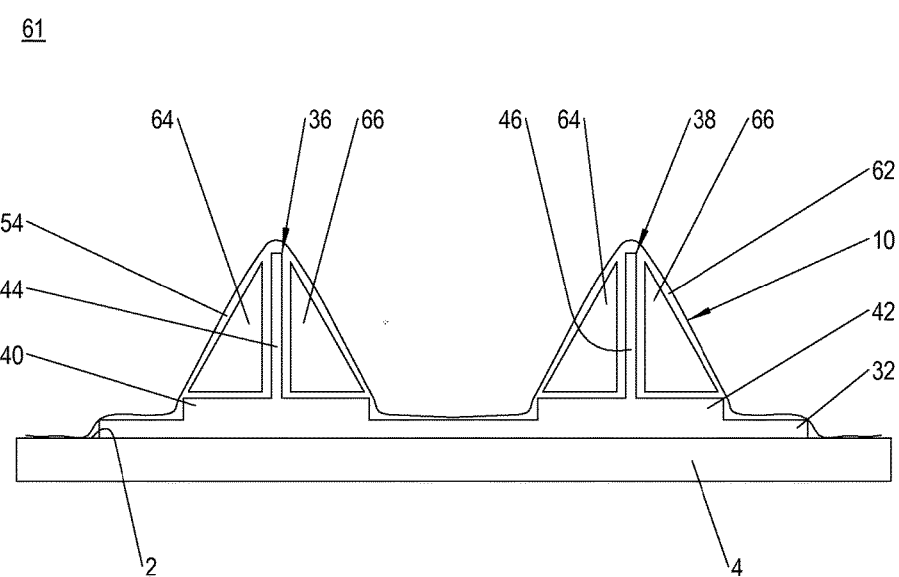
FIG. 4 shows a further representation of the second system.
Figure 5:
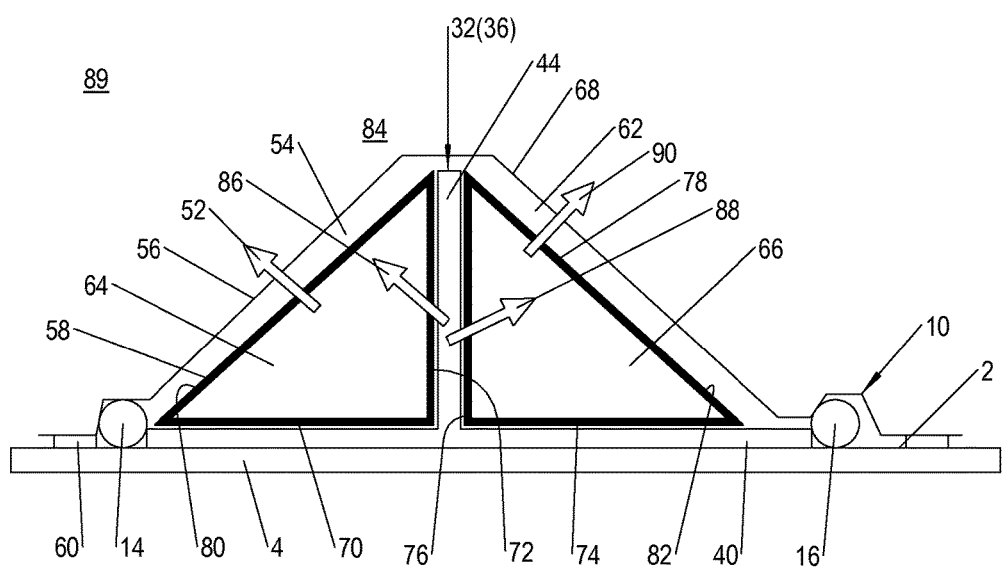
FIG. 5 shows a third system in accordance with the inventive infusion method.

For purposes of better visualisation of the membranes 58, 78 these are represented in FIG. 3 and also, in particular, in FIGS. 4 and 5 separated by means of a gap in each case from the foot section 44 and the web 40. Likewise for purposes of better visualisation of the gas reception spaces 54, 62 the chamber walls 56, 68 are represented in FIG. 3 and also in particular in FIGS. 4 and 5 separated by means of a gap in each case from the gas reservoirs 64, 66, i.e. from their membrane sections on the outer surface sides.

In the event of an evacuation of the composite component 32 to be infiltrated via the suction device 14, the gas reception spaces 54, 62 and thus the gas reservoirs 64, 66 are likewise evacuated as a result of the porous properties of the membranes 58, 78, so that the system 61 has an even reduced pressure relative to its external environment. With the infusion of the resin via the one or more sprues 16 the reduced pressure is maintained in the gas reception spaces 54, 62, so that the gas reservoirs 64, 66 can receive the residual air remaining in the system (see arrows 86, 88).

If we read across to a composite component 32 to be infiltrated with a multiplicity of stiffening elements 36, 38 spaced apart from one another, this means, as shown in a greatly simplified manner in FIG. 4, that the stiffening elements 36, 38 are stabilised by the dimensionally stable gas reservoirs 64, 66, acting as moulding elements, and that no gas reception space 54, 62 is designed, i.e. no gas reservoir 64, 66, is arranged, between the stiffening elements 36, 38, so that despite a local, i.e. a sub-arrangement of the gas reservoirs 64, 66 a two-dimensional leakage of the residual air from the composite component 32 is enabled.

FIG. 5 shows a third inventive system 89. This system 89 is based on the second system 61 elucidated in FIGS. 3 and 4, and has as its single difference a suction device (arrows 52, 90) assigned in each case to a gas reservoir 64, 66, via which the volatile substances stored by the gas reservoirs 64, 66 can be continuously, or discontinuously, led out of the system 89.

Disclosed is an infusion method for the manufacture of a fibre-reinforced composite component with semi-finished textile products in an open moulding tool, in which at least one local gas reception space is designed for the reception of volatile substances, such as resin gases and residual air contained in the matrix material and/or in the system, which gas reception space is blocked off from the matrix material by a local semi-permeable membrane; also disclosed is a system (assembly) for the execution of such a method.

REFERENCE SYMBOL LIST

1 System (Assembly)
2 Surface
4 Moulding tool
6 Component
8 Vacuum chamber
10 Vacuum film
12 Sealing element
14 Suction device (outlet)
16 Sprue (inlet)
18 Flow aid
20 Perforated film
22 Peel ply
24 Surface
26 Membrane
28 Air chamber
30 Ventilation ply
31 System
32 Component
34 Fabric
36 Stringer
38 Stringer
40 Foot section
42 Foot section
44 Web
46 Web
48 Sprue
50 Sprue
52 Suction device
54 Gas reception space
56 Chamber wall
58 Membrane
60 Sealing element
61 System
62 Gas reception space
64 Gas reservoir
66 Gas reservoir
68 Chamber wall
70 Contact surface
72 Contact surface
74 Contact surface
76 Contact surface
78 Membrane
80 Outer surface
82 Outer surface
84 External environment
86 Arrow (residual air)
88 Arrow (residual air)
89 System
90 Arrow (suction)

The invention claimed is:

1. An infusion method for the manufacture of a fibre-reinforced composite component comprising:
arranging semi-finished textile products in a moulding tool that is open on one side in a chamber to be evacuated, the semi-finished textile products configured to be infiltrated by a matrix material and the chamber to be evacuated being formed from a vacuum film which encloses the semi-finished textile products;
forming a local gas reception space between the semi-finished textile products and a wall section of the chamber, wherein the local gas reception space is formed between a section of the vacuum film and at least one local semi-permeable membrane;
infiltrating the semi-finished textile products with the matrix material;
blocking off the local gas reception space from the matrix material by the at least one local semi-permeable membrane that is porous to gas, and into which volatile substances contained in the matrix material and/or in the system leak during the infiltration process;
arranging a dimensionally stable gas reservoir in the local gas reception space, wherein the gas reservoir has a triangular cross-section, is used as a moulding element to laterally support a vertical portion of the semi-finished textile products, has an open-pore material structure, and is provided the at least one local semi-permeable membrane on contact surfaces facing toward the semi-finished textile products and located in contact with the latter, wherein the dimensionally stable gas reservoir contains the volatile substances leaked during the infiltration process; and
evacuating the chamber by a vacuum channel that is separate from the dimensionally stable gas reservoir.

2. The infusion method in accordance with claim 1, further comprising positioning the at least one local semi-permeable membrane on flat or slightly curved component surfaces.

3. The infusion method in accordance with claim 1, further comprising evacuating the local gas reception space during evacuation of the chamber.

4. The infusion method in accordance with claim 1, further comprising arranging another local gas reception space in a region of flow fronts that are running together.

5. The infusion method in accordance with claim 1, further comprising combining the dimensionally stable gas reservoir with a closed moulding element.

6. The infusion method in accordance with claim 1, further comprising extracting gases from the local gas reception space via a suction device.

7. The infusion method in accordance with claim 1, wherein the dimensionally-stable gas reservoir is adapted for maintaining reduced pressure in the local gas reception space.

8. The infusion method in accordance with claim 1, further comprising laterally supporting the vertical portion of the semi-finished textile products using a second dimensionally stable gas reservoir, wherein the second gas reservoir has a triangular cross-section, has an open-pore material structure, and is provided at least one local semi-permeable membrane on contact surfaces facing toward the semi-finished textile products and located in contact with the latter.

9. The infusion method in accordance with claim 1, wherein the vacuum channel is positioned at a side of a foot section of the semi-finished textile products.

10. The infusion method in accordance with claim 9, wherein the matrix material is provided by a sprue positioned at a side of a foot section of the semi-finished textile products.

* * * * *